United States Patent
Bando

[19]

[11] Patent Number: 5,832,801
[45] Date of Patent: Nov. 10, 1998

[54] NUMERICAL CONTROLLER CUTTER APPARATUS FOR CUTTING A GLASS PLATE

[75] Inventor: Shigeru Bando, Tokushima, Japan

[73] Assignee: Bando Kiko Co., Ltd., Tokushima, Japan

[21] Appl. No.: 864,359

[22] Filed: May 28, 1997

Related U.S. Application Data

[63] Continuation of Ser. No. 411,819, filed as PCT/JP94/01967, Nov. 21, 1994 published as WO96/15883, May 30, 1996, abandoned.

[30] Foreign Application Priority Data

Apr. 27, 1993 [JP] Japan ................................... 5-122165
Aug. 27, 1993 [JP] Japan ................................... 5-235755

[51] Int. Cl.[6] .................................................. B26D 7/00
[52] U.S. Cl. ................................ 83/483; 83/487; 83/940
[58] Field of Search ............................. 83/940, 879, 614, 83/487, 886, 887, 76.6, 76.9, 483, 485, 486, 486.1, 488, 489

[56] References Cited

U.S. PATENT DOCUMENTS

| | | | |
|---|---|---|---|
| 3,058,220 | 10/1962 | Eary .............................................. | 33/32 |
| 3,548,699 | 12/1970 | Gerber et al. .......................... | 83/940 X |
| 3,626,796 | 12/1971 | Pearl ..................................... | 83/940 X |
| 3,735,660 | 5/1973 | Pearl ..................................... | 83/940 X |
| 3,761,675 | 9/1973 | Mason et al. .......................... | 83/940 X |
| 3,797,339 | 3/1974 | Pape et al. ............................. | 83/487 X |
| 3,881,139 | 4/1975 | Inaba et al. .......................... | 318/135 X |
| 3,906,262 | 9/1975 | Shichida et al. ....................... | 310/13 X |
| 4,012,974 | 3/1977 | Reinmold ............................... | 83/614 X |
| 4,171,657 | 10/1979 | Halberschmidt et al. ............ | 83/886 X |
| 4,401,001 | 8/1983 | Gerber et al. ......................... | 83/940 X |
| 4,524,894 | 6/1985 | Leblond ................................ | 83/879 X |
| 4,595,871 | 6/1986 | Koehler ................................. | 318/696 |
| 4,709,483 | 12/1987 | Hembree et al. ..................... | 83/886 X |
| 4,912,746 | 3/1990 | Oishi .................................... | 318/135 X |

FOREIGN PATENT DOCUMENTS 3-115134 A  5/1991  Japan.
WO 93/21119 10/1993 Japan.

*Primary Examiner*—M. Rachuba
*Attorney, Agent, or Firm*—Nixon & Vanderhye

[57] ABSTRACT

Apparatus is provided for cutting a plate-like member, having a cutter head and a bridge frame for supporting the cutter head movably in the X-direction. The bridge frame is supported at opposite side ends thereof and is movable in the Y-direction on a base. A moving device is provided for linearly moving the cutter head in the X-direction, and a moving arrangement is provided for linearly moving the bridge frame in the Y-direction. The moving arrangement includes a linear motor disposed on the one end of the bridge frame and a second linear motor disposed on the other end of the bridge frame. A control device is provided for operating said first and second linear motors synchronously with respect to each other.

2 Claims, 4 Drawing Sheets

NUMERICAL CONTROLLER CUTTER APPARATUS FOR CUTTING A GLASS PLATE

This is a continuation of application Ser. No. 08/411,819, filed as PCT/JP94/01967, Nov. 21, 1994 published as WO96/15883, May 30, 1996, now abandoned.

TECHNICAL FIELD

The present invention relates to an apparatus for cutting a plate-like member such as a glass plate, a plastic plate, a wooden plate, and the like.

BACKGROUND ART

In a conventional apparatus for cutting, for instance, a glass plate, an apparatus for forming a bend-breaking line (cut line) on the glass plate, a screw shaft is connected via a nut to a moving table with a cutter head mounted thereon. The screw shaft is connected to an output rotating shaft of an electric motor by means of pulleys, a belt, and the like, and the screw shaft is rotated by the rotation of the output shaft of the electric motor to move the moving table in the X-direction, for example. A screw shaft is connected via a nut to a bed with a glass plate placed thereon. The screw shaft is connected to an output rotating shaft of an electric motor by means of pulleys, a belt, and the like. The screw shaft is rotated by the rotation of the output shaft of the electric motor to move the bed in the Y-direction, for example. Then a cutter wheel of the cutter head is moved relatively with respect to the glass plate along a configuration to be cut, i.e., the bend-breaking line to be formed.

With the above-described conventional apparatus for cutting a glass plate, since relatively long screw shafts are rotated, large deflecting vibrations easily occur in the screw shafts in a dangerous speed area. The result is that it is difficult to improve the operating efficiency by rotating the screw shafts at high speed and moving the moving table and the bed at high speed.

Incidentally, the above-described problem also occurs when a plate-like member, such as a plastic plate, a wooden plate, an iron plate, a steel plate, and the like, is directly cut without forming a cut line.

The present invention has been devised in view of the above-described aspects, and its object is to provide an apparatus for cutting a plate-like member which is capable of relatively moving the cutter head at high speed and accurately along a configuration to be cut with respect to the plate-like member. In this way, it is possible to improve the operating efficiency and obtaining high-quality worked products.

DISCLOSURE OF INVENTION

In accordance with the present invention, the above-described object is attained by an apparatus for cutting a plate-like member wherein a bridge frame for supporting a cutter head is supported on opposite sides thereof in such a manner as to be movable in a Y-direction. Y-direction linearly moving means for linearly moving the bridge frame in the Y-direction are respectively provided between the opposite sides of the bridge frame on one hand, and a base on the other. The Y-direction linearly moving means are constituted by linear motors, and both the linear motors are operated synchronously with each other.

In addition, in accordance with the present invention, the above-described object is also attained by the above-described apparatus for cutting a plate-like member wherein the cutter head is supported by the bridge frame in such a manner as to be movable in an X-direction. X-direction linearly moving means for linearly moving the cutter head in the X-axis direction is provided between the bridge frame and the cutter head, and the X-direction linearly moving means is constituted by a linear motor.

In the present invention, the cutter head in one example is provided with a cutter wheel for forming a cut line in the plate-like member, particularly a glass plate, and the cutter head in another example is provided with a laser device for cutting the plate-like member. The cutter head may be provided with a torch or the like for effecting gas cutting, arc cutting, water-jet cutting, plasma cutting, oxygen arc cutting, or the like instead of the cutter wheel or the laser device.

Objects to be cut in the cutting apparatus in accordance with the present invention are plate-like members such as glass plates, plastic plates, wooden plates, iron plates, steel plates, and the like. The plate-like members may be slightly curved.

In the apparatus for cutting a plate-like member in accordance with the present invention, the bridge frame is moved in the Y-direction by the synchronous operation of the Y-direction linearly moving means constituted by linear motors. Further, in a case where the X-direction linearly moving means is provided, the cutter head is moved linearly in the X-direction by the X-direction linearly moving means. Thus, the cutter head is moved at high speed along the configuration of the plate-like member to be cut in the X-Y plane.

In accordance with the present invention, since there are provided the Y-direction linearly moving means constituted by the linear motors for linearly moving the bridge frame in the Y-direction, it is possible to move the cutter head in the Y-direction at high speed. Moreover, since the opposite ends of the bridge frame are moved synchronously, it is possible to move the cutter head accurately in the Y-direction.

Next, a detailed description will be given of the present invention on the basis of a preferred embodiment of the apparatus for cutting a glass plate for forming a bend-breaking cut line in the glass plate and illustrated in the drawings. It should be noted that the present invention is not limited to the embodiment.

DETAILED DESCRIPTION OF PREFERRED EMBODIMENTS

Figure 1:
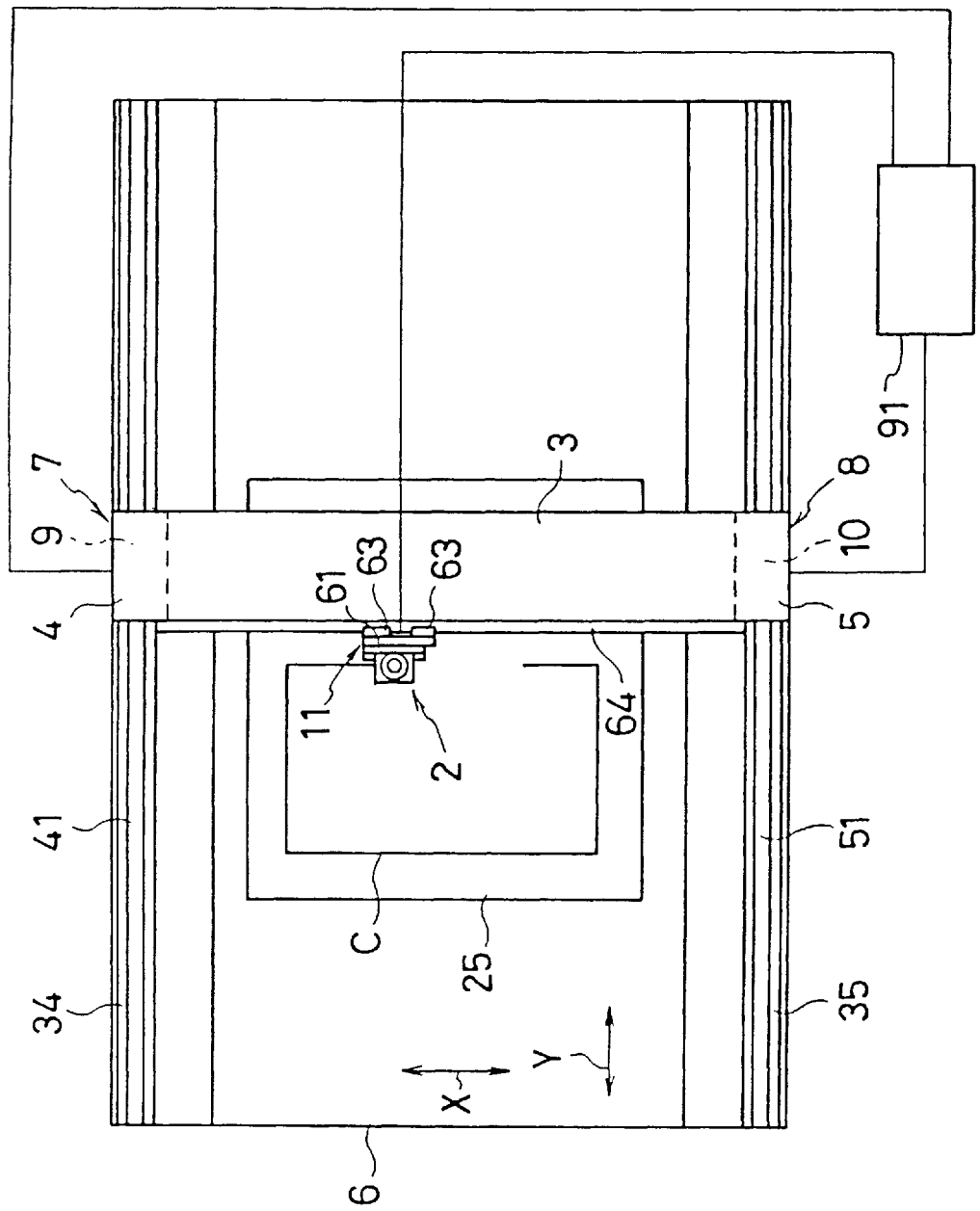
FIG. 1 is a plan view of a preferred embodiment of the present invention.
Figure 2:
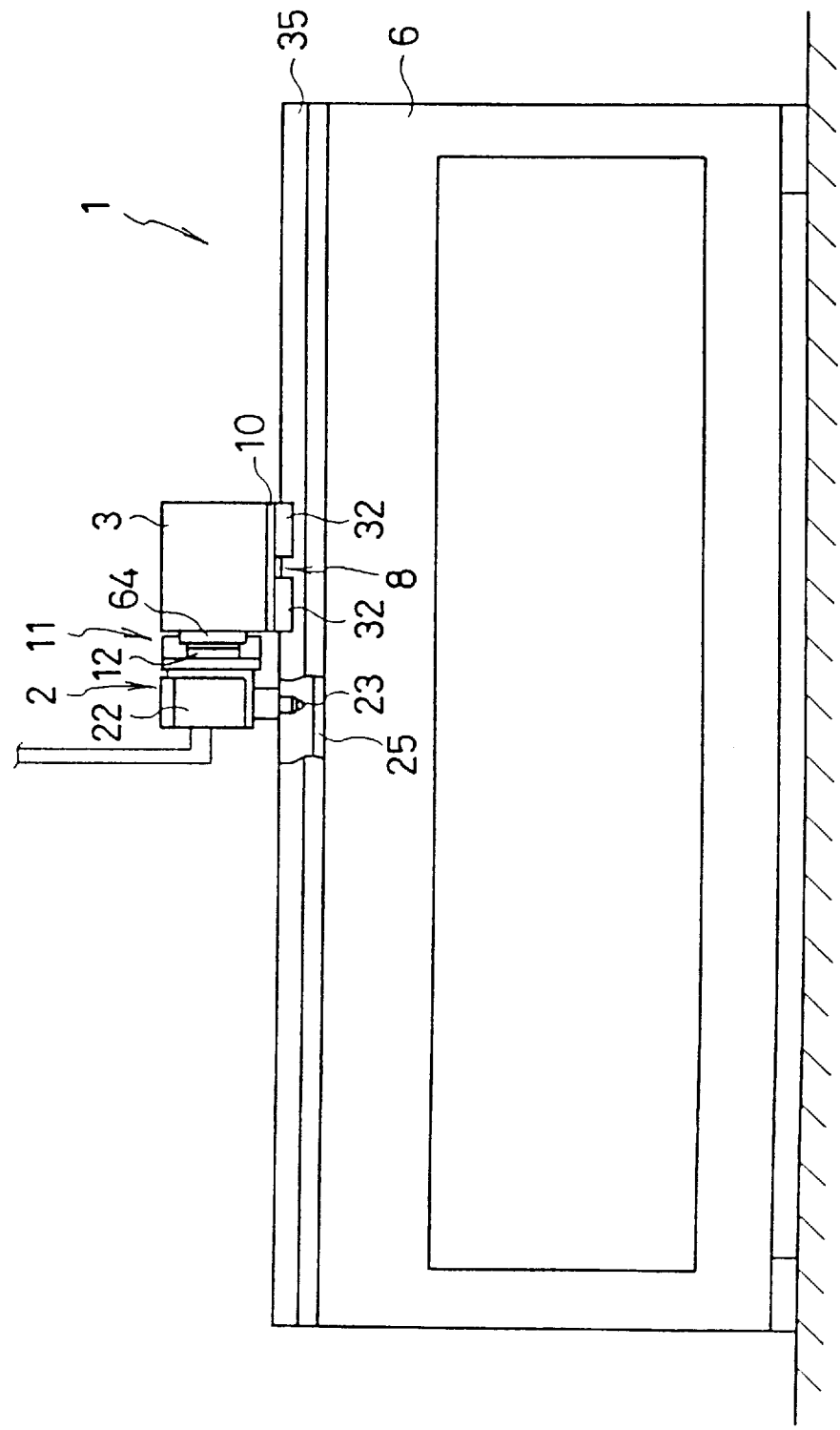
FIG. 2 is a front elevational view of the embodiment shown in FIG. 1.
Figure 3:
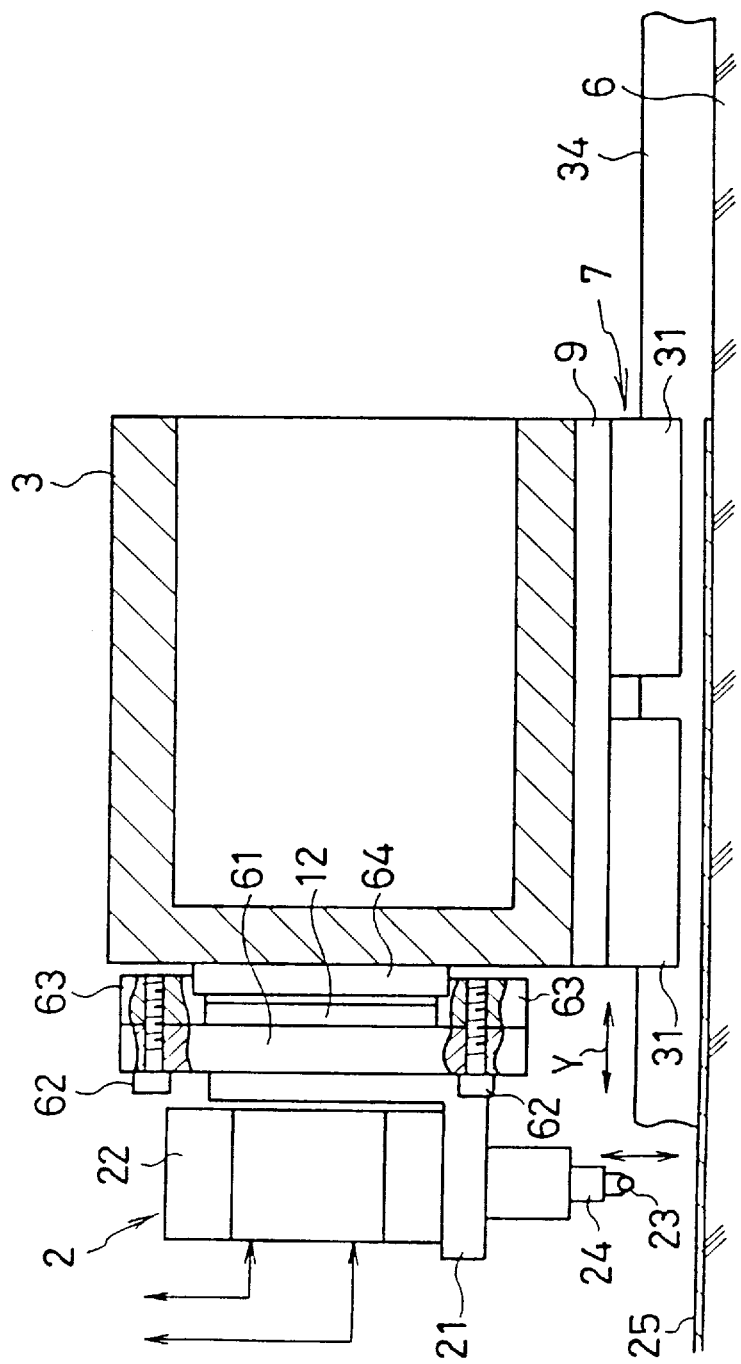
FIG. 3 is a partial detailed cross-sectional view of the embodiment shown in FIG. 1.
Figure 4A:
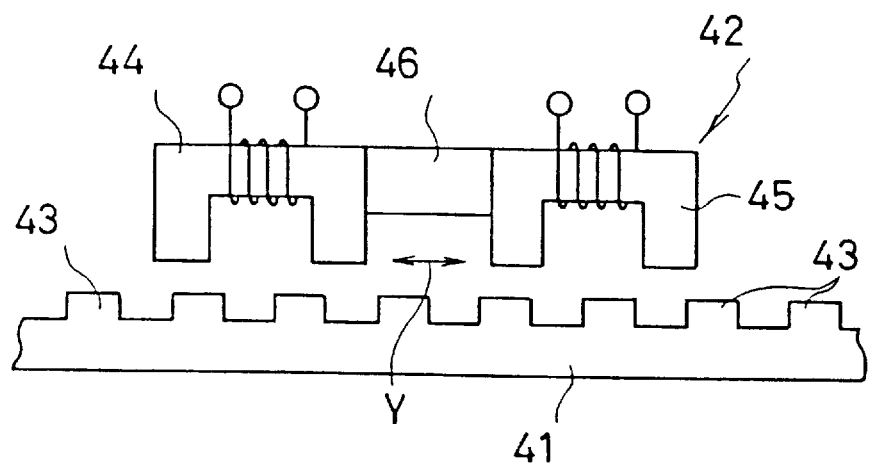
FIGS. 4a and 4b are explanatory diagrams of linear motors of the embodiment in FIG. 1.
Figure 4B:
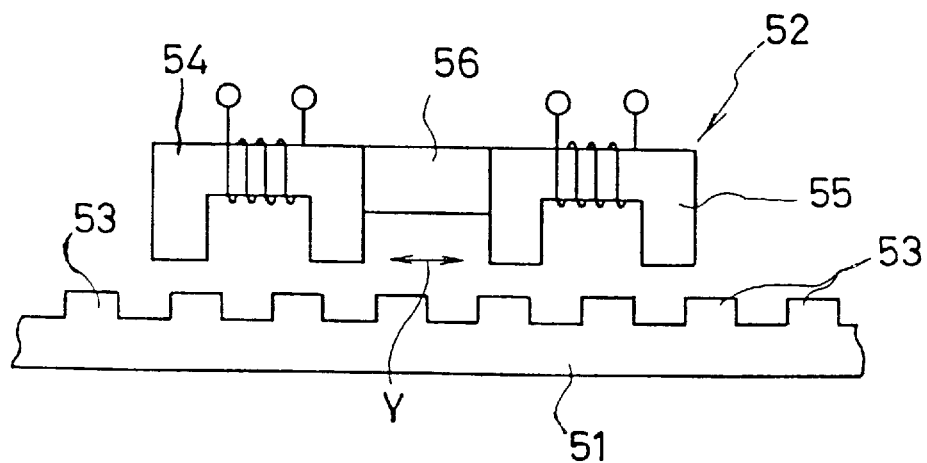

Referring to FIGS. 1–4, there is shown an apparatus 1 for cutting a glass plate. A bridge frame means 3 for supporting a cutter head 2 is supported by opposite ends 4 and 5 in such a manner as to be movable in the Y-direction. Y-direction first and second linearly moving means 7 and 8 for linearly moving the bridge frame 3 in the Y-direction are respectively provided between a base means 6 on the one hand, and the opposite ends 4 and 5 of the bridge frame 3 on the other. The Y-direction linearly moving means 7 and 8 are respectively constituted by linear motors 9 and 10, which are operated in synchronism with each other. The cutter head 2 is supported by the bridge frame 3 in such a manner as to be movable in the X-direction, and an X-direction linearly moving means 11 for linearly moving the cutter head 2 in the X-axis direction is provided between the bridge frame 3 and the cutter head 2. The X-direction linearly moving means 11 is constituted by a linear motor 12.

The cutter head 2 is comprised of an air cylinder device 22 attached to a bracket 21, and a cutter block 24 having a cutter wheel 23 and attached to a piston rod of the air cylinder device 22. As high-pressure air is supplied to and discharged from the air cylinder device 22, the cutter block 24 is moved vertically in the direction of the vertical double-headed arrow in FIG. 3 so as to allow the cutter wheel 23 to advance toward and retract from the surface of a glass plate 25. As the cutter wheel 23 is pressed against the surface of the glass plate 25 by the air pressure of the air cylinder device 22, a cut line (bend-breaking line) C is imparted to the glass plate 25.

Sliders 31 and 32 are respectively attached to the lower surfaces of the opposite sides 4 and 5 of the bridge frame 3. The slider 31 is fitted slidably in the Y-direction to a rail 34 which extends in the Y-direction and is laid on the base 6 where the glass plate 25 is placed, while the slider 32 is also fitted slidably in the Y-direction to a rail 35 which extends in the Y-direction and is laid on the base 6. Thus, the bridge frame 3 is made movable in the Y-direction while being guided by the rails 34 and 35.

The linear motor 9 of the Y-direction linearly moving means 7 provided at the side 4 of the bridge frame 3 is comprised of a stator 41 arranged on a central portion of the rail 34 along the Y-direction and a moving element 42 provided on the slider 31 with a fixed gap with respect to the stator 41. The stator 41 formed of an elongated plate made of a magnetic material has a plurality of teeth 43 formed at equal intervals on its surface facing the moving element 42, whereas the moving element 42 is provided with a pair of coils 44 and 45 with a core and a permanent magnet 46. In this linear motor 9, in the case of two-phase excitation, by consecutively changing the phase of the current supplied to the coils 44 and 45, the moving element 42 is moved by ¼ pitches of the pitch (interval) of the teeth 43. The linear motor 10 of the Y-direction linearly moving means 8 provided at the side 5 of the bridge frame 3 is formed in the same way as the linear motor 9, and is comprised of a stator 51 arranged on a central portion of the rail 35 along the Y-direction and a moving element 52 provided on the slider 32 with a fixed gap with respect to the stator 51. The stator 51 formed of an elongated plate made of a magnetic material has a plurality of teeth 53 formed at equal intervals on its surface facing the moving element 52, whereas the moving element 52 is provided with a pair of coils 54 and 55 with a core and a permanent magnet 56. This linear motor 10 also operates in the same way as the linear motor 9. The linear motors 9 and 10 are operated in synchronism with each other so as to move the sliders 31 and 32 in the same direction at the same speed, with the result that the opposite sides 4 and 5 of the bridge frame 3 are also moved in synchronism with each other in the Y-direction.

The bracket 21 is fixed to a base plate 61, and sliders 63 are attached to the base plate 61 by means of bolts 62. The sliders 63, which are slidable in the X-direction, are fitted to a rail 64 attached to a side surface of the bridge frame 3, and the cutter head 2 is thus supported by the bridge frame 3 in such a manner as to be movable in the X-direction. The linear motor 12 is formed in the same way as the linear motors 9 and 10, and is comprised of a stator arranged on a central portion of the rail 64 along the X-direction and a moving element provided on the slider 63 with a fixed gap with respect to the stator. The linear motor 12 operates in a manner similar to the linear motors 9 and 10.

Incidentally, the motors 9, 10, and 12 and the pneumatic cylinder device 22 are respectively connected to an operating means 91 in the form of a numerical controller. The motors 9, 10, and 12 and the pneumatic cylinder device 22 are operated and controlled by a program stored in advance in a storage device of the numerical controller 91.

The apparatus 1 for cutting a glass plate, described above, operates as follows. The motors 9 and 10 are operated synchronously by being controlled by the numerical controller 91, which causes the opposite sides 4 and 5 of the bridge frame 3 to similarly move synchronously in the Y-direction. At the same time, the motor 12 is operated by being controlled by the numerical controller 91, and the operation of the motor 12 moves the base plate 61 in the X-direction. As the bridge frame 3 is moved in the Y-direction and the base plate 61 is moved in the X-direction, the cutter head 2 is moved along the cut line C to be imparted. When the cutter head 2 is moved to the position to which the cut line C is to be imparted, the numerical controller 91 operates the pneumatic cylinder device 22 so as to lower the cutter block 24 and causes the cutter wheel 23 to be pressed against the surface of the glass plate 25. As a result, the predetermined cut line C is imparted to the surface of the glass plate 25 in correspondence with the configuration for bend-breaking.

In the apparatus 1 for cutting a glass plate, since there are no rotating long ball screws, the bridge frame 3 and the cutter head 2 are moved in the Y- and X-directions respectively and the cutter head 2 is moved to the position of the glass plate 25 to which the cut line C is to be imparted. This means that the cutter head 2 can be moved at high speed without the occurrence of deflecting vibrations due to the high-speed rotation of the long ball screws.

Although, in the above-described embodiment, the cutter head 2 is moved in the X-direction, an arrangement may be provided such that the cutter head 2 is fixedly mounted to the bridge frame 3, and the portion of the base 6 where the glass plate 25 is placed is moved in the X-direction by a similar mechanism.

In addition, detecting means for detecting the moving positions in the Y- and X-directions of the opposite sides 4 and 5 of the bridge frame 3 and the sliders 63 of the cutter head 2, such as Inductosyns or other similar noncontact detectors, may be provided in juxtaposition to the rails 34, 35 and 64 or the stators 41, 51 and the unillustrated stator of the linear motor 12. By supplying position detection signals from the detecting means to the numerical controller 91, feedback control may be effected so that the opposite ends 4 and 5 of the bridge frame 3 and the sliders 63 are moved accurately in the Y- and X-directions in accordance with commands of the numerical controller 91 on the basis of the position detecting signals.

Furthermore, in order to correct positioning errors in the Y- and X-directions of the bridge frame 3 and the cutter head 2 with respect to the glass plate 25 due to the difference in thermal expansion between the stators 41, 51, and the unillustrated stator of the linear motor 12 on the one hand, and the glass plate 25 on the other, or in a case where the detecting means are provided, due to the difference in thermal expansion including the same, temperature detectors may be provided. The linear motors 9, 10, and 12 may be operated by correction commands based on detecting signals from the temperature detectors.

I claim:

1. An apparatus for cutting a glass plate, comprising:

a base having opposite elongated edges and on which a glass plate is disposed;

a cutter head including a cutter wheel for forming a cut line on the glass plate;

a bridge frame supporting said cutter head for movement in an X-direction, said bridge frame having opposite sides, said bridge frame being supported along said opposite sides on said elongated edges of said base, respectively, for movement in a Y-direction;

first moving means for linearly moving said cutter head in the X-direction;

second moving means for linearly moving said bridge frame in the Y-direction, said second moving means having a first linear motor disposed on one of the opposite sides of said bridge frame and a second linear motor disposed on another of the opposite sides of said bridge frame, said first linear motor including a first elongated stator extending in the Y-direction on one of said elongated edges of said base, said first stator having a plurality of teeth at equal intervals on an upper surface thereof, and a first moving element having first coils to which electric currents are supplied in different phases to each other, said first moving element being attached to one of the opposite sides of said bridge frame with a fixed gap with respect to the upper surface of the first stator, said second linear motor including a second elongated stator extending in the Y-direction on another elongated edge of said base opposite said one elongated edge of the base, said second stator having a plurality of teeth at equal intervals on an upper surface thereof, and a second moving element having second coils, to which electric currents are supplied in different phases to each other, said second moving element being attached to another of the opposite sides of said bridge frame with a fixed gap with respect to the upper surface of the second stator; and means for operating said first linear motor and said second linear motor synchronously with respect to each other.

2. An apparatus for cutting a glass plate, comprising:

base means having opposite elongated edges and on which a glass plate is disposed;

cutter means including a cutter wheel for forming a cut line on a glass plate;

bridge frame means supporting said cutter means for movement in an X-direction, said bridge frame means having opposite sides, said bridge frame means being supported along said opposite sides on said elongated edge of said base means, respectively, for movement in a Y-direction;

first moving means for linearly moving said cutter means in the X-direction;

second moving means for linearly moving said bridge frame means in the Y-direction, said second moving means having a first linear motor disposed on one of the opposite sides of said bridge frame means and a second linear motor disposed on another of the opposite sides of said bridge frame means, said first linear motor including a first elongated stator extending in the Y-direction on one of said elongated edges of said base means, said first stator having a plurality of teeth at equal intervals on an upper surface thereof, and a first moving element having first coils to which electric currents are supplied in different phases to each other, said first moving element being attached to one of the opposite sides of said bridge frame means with a fixed gap with respect to the upper surface of the first stator, said second liner motor including a second elongated stator extending in the Y-direction on another elongated edge of said base means opposite said one elongated edge of the base means, said second stator having a plurality of teeth at equal intervals on an upper surface thereof and a second moving element having second coils to which electric currents are supplied in different phases to each other, said second moving element being attached to another of the opposite sides of said bridge frame means with a fixed gap with respect to the upper surface of the second stator; and means for operating said first and second linear motors synchronously with respect to each other.

* * * * *

UNITED STATES PATENT AND TRADEMARK OFFICE
CERTIFICATE OF CORRECTION

PATENT NO. : 5,832,801
DATED : November 10, 1998
INVENTOR(S) : SHIGERU BANDO

It is certified that error appears in the above-identified patent and that said Letters Patent is hereby corrected as shown below:

On the title page, item 54, and column 1, line 1:

The title should read --APPARATUS FOR CUTTING GLASS PLATE--,

Signed and Sealed this

Fourth Day of May, 1999

Attest:

Q. TODD DICKINSON

*Attesting Officer*  *Acting Commissioner of Patents and Trademarks*